United States Patent [19]

Dowd, deceased et al.

[11] 4,436,540
[45] Mar. 13, 1984

[54] LOW PRESSURE SEPARATION FOR LIGHT HYDROCARBON RECOVERY

[75] Inventors: Edward J. Dowd, deceased, late of Summit, N.J., by Dorothy N. Dowd, legal representative; Joseph F. Carpency, Morristown, N.J.

[73] Assignee: Exxon Research & Engineering Co., Florham Park, N.J.

[21] Appl. No.: 434,584

[22] Filed: Oct. 15, 1982

[51] Int. Cl.³ .............................................. F25J 3/02
[52] U.S. Cl. .......................................... 62/30; 62/31; 62/33; 62/34
[58] Field of Search .................. 62/23, 24, 29, 30, 31, 62/32, 33, 34

[56] References Cited

U.S. PATENT DOCUMENTS

| | | | |
|---|---|---|---|
| 2,938,934 | 5/1960 | Williams | 260/677 |
| 3,641,190 | 2/1972 | Kivlen et al. | 260/683 |
| 3,729,944 | 5/1973 | Kelley et al. | 62/39 |
| 3,947,146 | 3/1976 | Schuster | 415/1 |

FOREIGN PATENT DOCUMENTS 1077918 11/1965 United Kingdom .

OTHER PUBLICATIONS

Pratt and Foskett, Trans. Amer. Inst. Chem. Engrs., 42, 149 (1946).
J. R. Fair et al., Chem. Eng. Prog., 54, (No. 12), 39–47, Dec. 1953.
W. K. Lam et al., Oil & Gas Jl. 111, May 18, 1970.

Primary Examiner—Frank Sever
Attorney, Agent, or Firm—Rebecca Yablonsky

[57] ABSTRACT

Net horsepower required for recovering high purity ethylene is reduced by process gas compression of furnace effluent to only low pressures before entering recovery facilities. The compressor discharge undergoes chilling in heat exchangers or pumparound towers designed for small pressure drops. Hydrocarbons condensed during chilling are pumped to higher pressures for fractionation.

14 Claims, 1 Drawing Figure

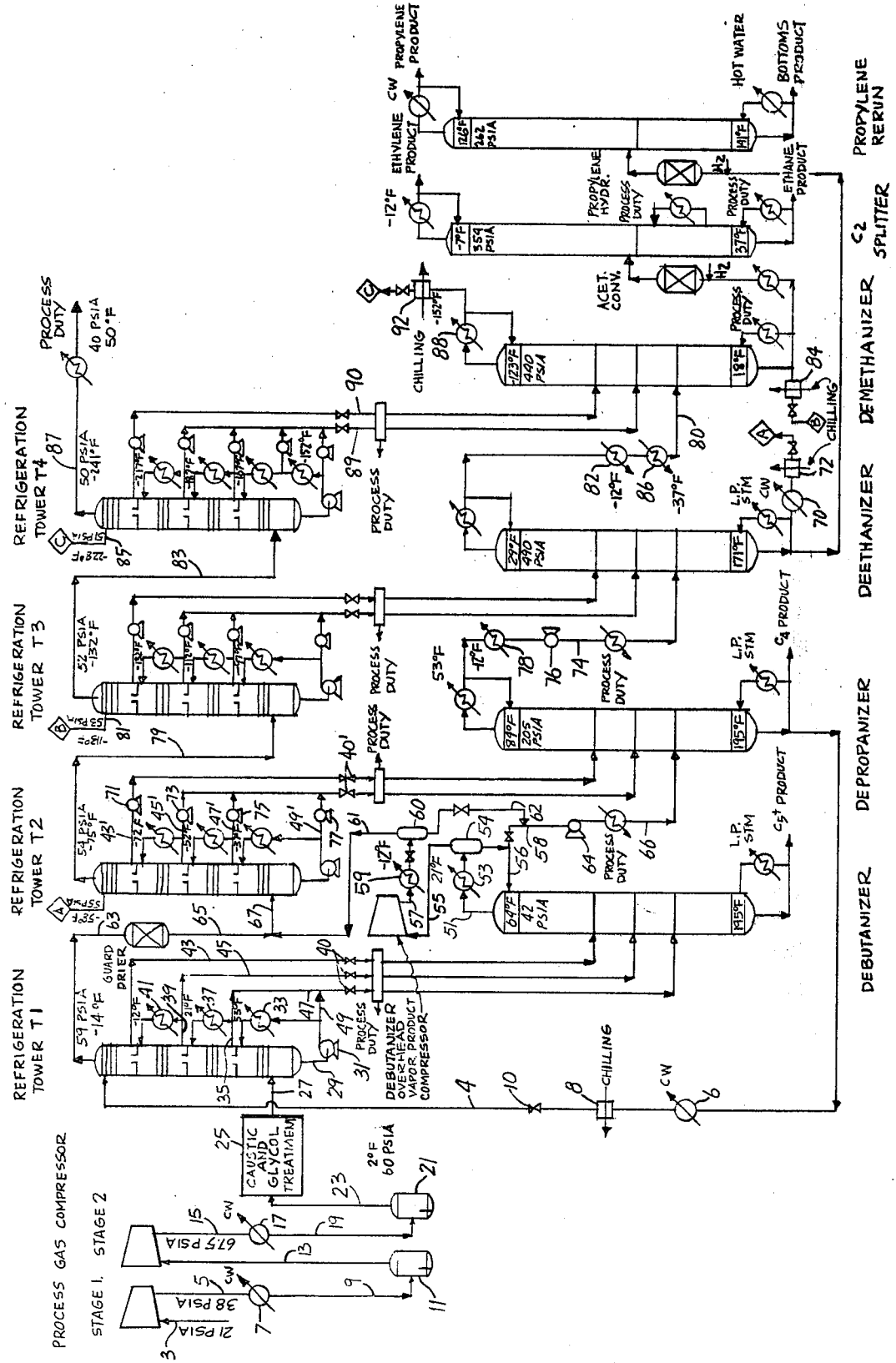

LOW PRESSURE SEPARATION FOR LIGHT HYDROCARBON RECOVERY

This invention relates to the separation of light ends fractions obtained in petroleum processing which may contain hydrogen, methane, ethylene, ethane, propylene, propane and $C_4$'s and heavier, as well as small amounts of acetylene and carbon monoxide. Such fractions may be derived from various petroleum refinery sources and from pyrolysis of hydrocarbons including catalytic cracking; and thermal cracking such as partial combustion cracking, in particular cracking in the presence of steam.

Steam cracking is a well-known process and is described in U.S. Pat. No. 3,641,190 and British Pat. No. 1,077,918, the teachings of which are hereby incorporated by reference. In commercial practice, steam cracking is carried out by passing a hydrocarbon feed mixed with 20–92 mol.% steam through metal pyrolysis tubes located in a fuel fired furnace to raise the feed to cracking temperatures, e.g., about 1200° to 1800° F. and to supply the endothermic heat of reaction for the production of products including unsaturated light hydrocarbons, particularly $C_2$–$C_4$ olefins and diolefins, especially ethylene, useful as chemicals and chemical intermediates.

Ethylene in particular is in great demand for the synthesis of organic chemicals such as glycols, alcohols, plastics and solvents. Cracking of hydrocarbons which may range from gases up to liquids such as naphtha and gas oil, in the presence of steam has been widely used for its production, in fact such plants are termed ethylene plants. Since the resolution of the light ends fraction into its constituents, in the cryogenic section or cold end of the steam cracking plant, consumes large amounts of energy owing to the compression/refrigeration requirements when such low boiling gaseous materials are separated by distillation, there is a need for a process which would achieve savings in energy. Nonetheless, separation methods in common use have remained relatively static for many years.

BACKGROUND OF THE INVENTION

Conventional recovery facilities for ethylene plants via fractionation generally involve compression of cracked feed gas to high pressures, 400–600 psia, e.g., about 550 psia, followed by extensive chilling and fractionation for products separation. The normal sequence of fractionation is demethanization, followed by deethanization, depropanization and debutanization. For purposes of comparison such process will be termed herein "Base Case". It may be noted that such process requires the entire gaseous effluent of cracking to be compressed to, e.g., 550 psia, of which about one third is tail gas, viz., $H_2$+methane. However, tail gas is not required to be compressed to that level-because for subsequent use it is generally let down to much lower pressure—and the energy used up in doing so cannot all be recovered. The present invention aims to avoid high compression of tail gas.

A high pressure process is discussed by J. R. Fair et al. in *Chem.Eng. Prog.*, 54 (No. 12) 39–47, December 1953. Particular emphasis is placed on the separation of the gas into two fractions: one comprising methane and lighter materials and the other comprising ethylene and heavier materials, viz., demethanization which is said to be the major step. The most popular level of feed gas compression in the United States is stated to be 450–600 psia. In this article, feed gas, from which the majority of $C_5$ and heavier components have been removed, is compressed to this level. The authors note that the principal energy requirements for demethanization are feed gas compression and refrigeration. It is also mentioned that pre-removal of unsaturated $C_4$ and heavier materials may be desirable in some instances. U.S. Pat. No. 2,938,934 discloses a method wherein, in an initial depropanizer, $C_4$ and heavier materials are removed as bottoms. The overhead gas is then compressed to 450 psia and passed to a demethanizer; the deethanizer follows the demethanizer. Therefore, high compression of tail gas is not avoided. In U.S. Pat. No. 3,729,944 a cracked gas is subjected to staged compression with interstage cooling and a gas-liquid mixture therefrom is introduced into a first fractionation zone at 177 psia. The $C_{4+}$ materials are removed as bottoms and the overhead is compressed to 335 psia and processed for further fractionation/separation. Here also there is compression of tail gas to high levels.

Other literature of general interest includes:
- Pratt and Foskett, Trans. Amer. Inst. Chem. Engrs. 42, 149 (1946).
- W. K. Lam et al., Oil and Gas Jl. 111, May 18, 1970.

SUMMARY OF THE INVENTION

According to the invention, a feed gaseous mixture containing light hydrocarbons, e.g., in the range of $C_1$ to $C_{5+}$, and which may also contain hydrogen, is separated by compressing the feed gas to a pressure in the range of 40 to 125 psia, preferably 50 to 100 psia, passing the gas in series through a series or cascade of refrigeration zones maintained at temperatures that progressively decrease in the series, to condense in each zone a liquid portion of increasing volatility in the series, passing or pumping, as need be, the liquid portion of each zone to a connected, respective fractionation tower maintained at suitable temperature and pressure conditions for effecting fractionation thereof and carrying out said fractionation, thereby achieving separation of the feed gas into fractions.

Preferably, the feed gas is the light ends from the thermal cracking, especially steam cracking, of hydrocarbons, particularly liquid hydrocarbons such as naphtha and gas oil. The invention is also applicable to feed gas containing essentially $C_1$ to $C_4$ hydrocarbons with or without hydrogen.

Although much of the energy not expended in compression is shifted to increased pumping and refrigeration requirements, it has surprisingly been found that, within the ranges of feed gas inlet pressure given above, there is a net reduction in energy consumption. In the separation of light ends from a pyrolysis process, this reduction is maximum for liquid hydrocarbon cracking feeds and some reduction can be obtained for mixed liquid/gas hydrocarbon cracking feeds (such as when recovered ethane is recycled) so that it is desirable that at least some portion of the cracking feed be liquid. The method is capable of producing high purity products, e.g., ethylene, propylene, etc.

In the subject process of fractional liquefaction or condensation, energy conservation is achieved partly via lowered gas compression requirements by virtue of the fact that:

(1) compression of total feed gas is only to relatively low pressure values, as contrasted with Base Case.

(2) separation is by refrigeration/condensation of highest-to-lowest molecular weight fractions to leave a tail gas without the necessity of compression thereof.

(3) then, the refrigerated, condensed fractions are passed or pumped, as may be necessary, to individual fractionation towers for rectification, still without compressing tail gas.

It follows, therefore, that tail gas is never compressed to high pressures as practiced in the prior art.

Pumping liquid to increase pressure uses less energy than compressing gas. Also, coldest refrigeration (which requires the most energy to produce, of the various refrigeration levels used) is applied to the smallest mass since this is only what is left after removing the more readily condensible materials—this also makes it possible to save energy.

In summary, the energy savings are mainly attributed to two factors:

(1) tail gas is not compressed to pressure higher than necessary.

(2) hydrocarbons are pumped rather than compressed to high pressures for economic fractionation.

As contrasted with conventional operation in which the feed from pyrolysis is compressed in several stages with interstage cooling, to highest pressures, e.g., about 550 psia, then sent through a cascade of distillation towers at progressively lower pressures, the present invention is characterized by sharply lower feed gas compression outlet pressure—in which sense it is termed a low pressure separation process—and by the reverse process sequence, viz., removing the highest-to-lowest molecular weight fractions in the sequence so that demethanization occurs last.

In a preferred embodiment, a gaseous mixture which contains light olefinic constituents and includes $C_5+$'s, viz., it may contain small amounts of hydrocarbons vicinal to $C_5$ such as $C_6$–$C_9$, down to methane and hydrogen, is subjected to cooling in a first refrigeration zone to condense a portion concentrated in $C_4$–$C_{5+}$ which is removed; the overhead from said first zone is subjected to further cooling to lower temperatures in a second refrigeration zone to condense a portion concentrated in $C_3$–$C_4$ which is removed; the overhead from said second zone is subjected to further cooling to lower temperatures in a third refrigeration zone to condense a portion concentrated in $C_2$–$C_3$ which is removed; and the overhead from said third zone is subjected to further cooling to lower temperatures in a fourth refrigeration zone to condense a portion concentrated in $C_1$–$C_2$ and leave a tail gas. The condensed $C_1$–$C_2$ fraction is pumped to a demethanizer wherein at increased pressure and suitable temperature a purified liquid $C_2$ fraction is separated from methane. It can be seen, therefore, that the overhead comprising tail gas of said fourth refrigeration zone is never subjected to high pressure. The aforementioned other condensates are likewise crude fractions since a clean separation to achieve the high purity desirable for commercial use, is not made in the refrigeration zones. Therefore, to attain the wanted purity, each is suitably passed or pumped to a connected, respective fractionation tower in which it is rectified, preferably with addition of overhead vapor and/or liquid from the next preceding fractionation tower (except in the case of the first tower). Thus, liquids condensed in the chilling process are pumped to higher pressures for fractionation.

BRIEF DESCRIPTION OF THE DRAWING

The drawing illustrates the process sequence and suitable equipment therefor, of a preferred embodiment of the invention. Like numbers are used to designate like parts.

DETAILED DESCRIPTION

In a liquids steam cracker with ethane being recycled to the cracking furnace, a lights end fraction is obtained from the primary fractionator, having the typical mol.% composition shown in Table I, which is not to be considered as limiting the invention:

TABLE I

| Component | Mole Percent |
|---|---|
| $H_2$ | 12.3 |
| Methane | 21.5 |
| Ethylene | 25.0 |
| Acetylene | 0.30 |
| Ethane | 7.94 |
| Propylene | 11.0 |
| Propane | 0.52 |
| Methyl acetylene | 0.41 |
| Butadiene | 2.46 |
| Isobutylene | 2.48 |
| Butene-1 | 0.74 |
| Cis-butene-2 | 0.68 |
| Pentene-1 | 0.74 |
| Pentane | 0.83 |
| Isopentane | 0.68 |
| 2-methylpentane | 0.55 |
| Cis-hexene-2 | 0.35 |
| Benzene | 1.68 |
| Toluene | 1.26 |
| Metaxylene | 0.85 |
| 1,2,3-trimethyl benzene | 0.32 |
| $H_2O$ | 7.80 |
| Total | 100.0 |

It will be understood that the composition can vary depending on the specific liquid hydrocarbon feed chosen and on the parameters selected for cracking temperature, residence time and hydrocarbon partial pressure in the pyrolysis zone which affect selectivity to ethylene.

Further, the following detailed description refers to a particular embodiment which is to be considered illustrative and not limiting.

With reference to the drawing, suitable apparatus comprises a process gas compressor, a refrigeration train and a fractionation train.

In general, the technique of multi-stage gas compression and the removal of the compression heat obtained in each compression stage is known in the art—see for example U.S. Pat. No. 3,947,146. However, in the present process fewer compression stages are needed, in the preferred embodiment here described only two.

The compression effluent then undergoes extensive refrigeration in pumparound towers which minimize pressure drop. Alternatively, conventional heat exchangers may be used in place of pumparound towers for chilling purposes but the pressure drop during chilling will be slightly higher.

Referring to the drawing, feed gas of the composition described above at 21 psia is introduced by line 3 into first stage compressor 1 where, in this illustration, it is compressed to 38 psia, then passed by line 5 through heat exchanger 7 cooled by cooling water (CW), then through line 9 into drum 11 where vapor and liquid are separated. The vapor is then passed by line 13 into second stage compressor 2 where, in this illustration, it is compressed to 67.5 psia, then passed by line 15 to heat exchanger 17, then through line 19 into drum 21 where vapor and liquid are separated. Suitably the vapor is then passed by line 23 to caustic and glycol treatment facilities 25 where it is treated to remove trace amounts of acidic gases such as $CO_2$, $H_2S$ as well as water, in a manner known per se. The treated gas is then introduced via line 27 into the bottom of the first of the pumparound refrigeration towers, T-1. T-1 also receives, at the top, via line 4, a liquid $C_4$ stream taken from the bottom of the depropanizer then cooled by cooling water in heat exchanger 6 and chilled in chilling unit 8 and at 2° F. and 60 psia passed into T-1. Valve 10 may be used to control flow of this stream. The liquid $C_4$ stream introduced by line 4 and the gaseous effluent introduced by line 27 flow countercurrent to one another and equilibration between lighter gas and heavier liquefying phases takes place in refrigeration tower T-1. This is typical of operation in T-2, T-3 and T-4 (except that liquid introduced at the top of the tower is of decreasing carbon number, e.g., $C_3$, $C_2$ and $C_1$).

A bottoms stream is withdrawn from T-1 via line 29, pumped by means of pump 31 through heat exchanger 33 wherein it is cooled, and re-enters T-1. A portion is withdrawn by line 49. A mid-section stream is withdrawn via line 35, pumped through heat exchanger 37 wherein it is cooled, and re-enters T-1. A portion is withdrawn by line 47. An upper stream is withdrawn via line 39, pumped through heat exchanger 41 wherein it is cooled, and re-enters T-1. A portion is withdrawn by line 45. A top stream is withdrawn by line 43. For simplicity, not all pumps are shown. This repeated cooling of withdrawn streams causes a temperature gradient to be established in the column, the temperature decreasing up the column. This brings about a rough separation. The heavier, more readily condensible materials in the zone become liquid and drop down, the lighter, more volatile materials concentrating in the gas which goes to the top. The same phenomena occur in refrigeration towers T-2, T-3 and T-4. The temperatures of the refrigerants used in the various heat exchangers, for this embodiment, are shown in the drawing, and are also not be considered as limiting the invention. Refrigerants for the heat exchangers are selected from, e.g., liquid propylene (for refrigerant levels of 53° down to −52° F.), ethylene (for levels of −72° down to −152° F.) and methane (for levels of −167° down to −217° F.) to obtain the desired process temperatures. The overhead gas of T-1 is essentially devoid of $C_{5+}$ materials and rich in lighter, viz., it is a $C_{4-}$ fraction. The liquid streams taken out of T-1 contain all of the $C_{5+}$ *materials and substantial amounts of* $C_4$'s and some lighter, viz., they are $C_4$–$C_{5+}$ concentrates. Valves 40 may be used to control flow of the liquid streams.

Liquid sidestreams taken from T-1 via lines 43, 45 and 47 (supplemented by line 49) respectively at temperatures of −8° F., 28° F. and 60° F., are passed into the debutanizer. Since the pressure, 59 psia, in T-1 is higher than the pressure, 42 psia, in the debutanizer, pumping is not necessary and the liquids flow to the debutanizer. In passing, the streams are used for process duty, i.e., for cooling other plant effluents so that they themselves become warmer. This is likewise true of other streams for which process duty is indicated in the drawing. Typically there is a mixture of gas and liquid going into the fractionating towers which are run warmer anyway. Recovering process duty at these cold temperatures reduces refrigerant compression requirements. Low pressure steam (L.P. Stm) consumption in the fractionating tower reboilers is also reduced.

The debutanizer is run at a top temperature of 64° F. and a bottom temperature of 195° F. It separates a liquid bottoms $C_{5+}$ product which is removed and passes overhead a $C_{4-}$ fraction. Since the debutanizer is only at a pressure of 42 psia and the overhead is to be passed partly into refrigeration tower T-2 at 54 psia, the vapor overhead must be compressed in the debutanizer overhead vapor product compressor to 65 psia to effect this purpose. Therefore, it is passed via line 51 into heat exchanger 53 where it is cooled to 32° F., then passed to drum 54 where vapor and liquid are separated. The vapor portion is then passed via line 55 into the compressor where it is compressed to 65 psia, passed via line 57 into heat exchanger 59 where it is cooled to −2° F., followed by a separation of vapor and liquid in drum 60. The vapor portion from drum 60 is passed via lines 61 and 67, and at a pressure of 56 psia and a temperature of −14° F. is introduced into the bottom of tower T-2. A portion of the liquid from drum 54 is returned by line 56 as reflux to the debutanizer while the remaining liquid is passed by line 58 to join the liquid portion from drum 60 in line 62.

The combined stream is pumped to 215 psia in pump 64 and passed to the depropanizer by line 66 at a temperature of 20° F. and a pressure of 213 psia after giving up some refrigeration for process duty.

The overhead from tower T-1 is passed by line 63 into a guard drier to remove traces of water and then by line 65 to join the effluent in line 61 and pass into the bottom of tower T-2 by line 67. T-2 also receives, at the top, via line 69, a highly concentrated liquid $C_3$ stream, labeled A, taken from the bottom of the deethanizer, cooled by cooling water in heat exchanger 70 and chilled in chilling unit 72, and, at −58° F. and 55 psia, introduced into T-2.

T-2, run at lower temperatures than T-1, similarly separates liquid sidestreams from a gaseous overhead. Liquid sidestreams taken from T-2 via lines 43', 45' and 47', respectively, at temperatures of −69° F., −45° F. and −30° F. and a liquid bottoms stream taken via line 49' are pumped by pumps 71, 73, 75 and 77 respectively into the depropanizer. This is necessitated because the pressure, 54 psia, in T-2 is lower than the pressure, 205 psia, in the depropanizer. The liquids are pumped to high pressure before refrigeration is recovered as process duty. Valves 40' may be used to control flow of the liquid streams. The overhead gas of T-2 is essentially devoid of $C_{4+}$ materials and rich in lighter, viz., it is a $C_3$-fraction. The liquid streams taken out of T-2 are concentrated in $C_3$–$C_4$'s as is also the overhead stream from the debutanizer passed into the depropanizer.

The depropanizer is run at a top temperature of 84° F. and a bottom temperature of 195° F. It separates a liquid buttoms $C_4$ product which is removed, a portion being sent to T-1 as aforesaid, and passes overhead a vapor $C_3$-fraction, which is condensed in heat exchanger 78, pumped to 510 psia in pump 76 and passed into the deethanizer by line 74. This is necessitated because the pressure, 205 psia, in the depropanizer is lower than the pressure, 490 psia, in the deethanizer. The overhead from tower T-2 is passed by line 79 into the bottom of tower T-3. T-3 also receives, at the top, via line 81 a highly purified liquid $C_2$ stream, labeled B, taken from the bottom of the demethanizer, chilled in chilling unit 84 and, at −113° F. and 53 psia, introduced into T-3.

T-3, run at lower temperatures than T2, similarly separates liquid sidestreams, in this case at temperatures of −127° F., −105° F. and −90° F., which are pumped from a pressure of 52 psia up to high pressure to introduce them into the deethanizer which is maintained at 490 psia. The explanation given with regard to T-2 sufficiently explains the operation of T-3 and T-4. The overhead gas of T-3 is essentially devoid of $C_{3+}$ material and rich in lighter, viz., it is a $C_{2-}$ fraction. The liquid streams taken out of T-3 are highly concentrated in $C_2$-$C_3$'s as is also the overhead stream from the depropanizer passed into the deethanizer.

The deethanizer is run at a top temperature of 29° F. and a bottoms temperature of 171° F. It separates a liquid bottoms $C_3$ product which is removed, a portion being sent to T-2 is aforesaid, and sends overhead a vapor $C_2$-fraction which is passed into the demethanizer via line 80 after being chilled in heat exchanger 82 to −5° and in heat exchanger 86 to −30° F. The overhead from tower T-3 is passed by line 83 into the bottom of tower T-4. T-4 also receives, at the top, via line 85 a 97+mole% methane stream, labeled C, taken from the top of the demethanizer, cooled in heat exchanger 88 to −137° F. and chilled in chilling unit 92, then at −228° F. and 51 psia, introduced into T-4.

The $C_3$ bottoms product of the deethanizer, is sent to propylene recovery facilities which suitably may include a propylene hydrogenation unit (propylene hydrofiner) and fractionation tower (propylene rerun tower) as shown in the drawing. Chemical grade propylene product (93+mole%) is recovered as overhead from the fractionation tower. A $C_3$ splitter may follow to produce polymer grade propylene (99+mole%).

T-4, run at the lowest temperatures of all the refrigeration towers, similarly separates liquid sidestreams, in this case at temperatures of −220° F., −180° F., −160° F., and 145° F., which are pumped from a pressure of 50 psia up to high pressure to introduce them into the demethanizer which is maintained at 440 psia. The overhead tail gas of T-4 at 50 psia and −241° F. is recovered via line 87 and, after giving up its refrigeration for process duty, may be used as fuel gas or for other purposes. In this illustration the composition of the tail gas in line 87 is as follows in Table II:

TABLE II

| Component | Mole Percent |
| --- | --- |
| $H_2$ | 5.19 |
| Methane | 94.34 |
| Ethylene | 0.47 |
| Acetylene | <0.01 |
| Ethane | <0.0002 |
| Total | 100.00 |

The liquid streams 89,90 taken out of T-4 and the overhead stream 80 from the deethanizer passed into the demethanizer are essentially comprised of $C_2$'s and $C_1$ although varying considerably in percentage composition as shown in Table III below:

TABLE III

| | Mole Percent | | |
| --- | --- | --- | --- |
| Component | Stream 80 | Stream 89 | Stream 90 |
| $H_2$ | 0.089 | 0.064 | 0.075 |
| Methane | 5.64 | 11.81 | 43.73 |
| Ethylene | 64.14 | 70.34 | 53.16 |
| Acetylene | 1.09 | 0.65 | 0.11 |
| Ethane | 28.92 | 17.14 | 2.92 |
| $C_3$ | 0.12 | | |

TABLE III-continued

| | Mole Percent | | |
| --- | --- | --- | --- |
| Component | Stream 80 | Stream 89 | Stream 90 |
| Total | 100.0 | 100.0 | 100.0 |

The demethanizer is run at a top temperature of −123° F. and a bottoms temperature of 18° F. It separates a liquid bottoms pure $C_2$ fraction of the composition shown in Table IV:

TABLE IV

| Component | Mole Percent |
| --- | --- |
| Methane | 0.0076 |
| Ethylene | 75.23 |
| Acetylene | 0.90 |
| Ethane | 23.81 |
| Propylene | 0.048 |
| Propane | 0.0049 |
| Total | 100.0 | and passes overhead a concentrated methane vapor stream C which is sent to tower T-4 as aforesaid.

The $C_2$ bottoms product of the demethanizer is sent to a $C_2$ splitter, suitably after being treated with hydrogen in an acetylene converter to remove traces thereof. The $C_2$ splitter fractionates the $C_2$ feed into an overhead pure (99.95+mole%) ethylene product and a liquid bottoms pure (99+mole%) ethane product.

The saving in BHP (brake horsepower) is shown in Table V by the comparison of Base Case with the present invention for two feed gas inlet pressures, 67.5 psia (Case 1) and 117.5 psia (Case 2):

TABLE V

| | Base Case | Present Invention | |
| --- | --- | --- | --- |
| | | Case 1 | Case 2 |
| Total BHP | 92150 | 85900 | 91550 |
| Δ BHP | — | (6250) | (600) |
| Δ% of BHP | — | (6.78) | (0.65) |

Thus, it can be seen that for Case 1 a saving of 6.78% BHP is achieved over Base Case. Case 2 still uses somewhat less horsepower than Base Case. Therefore, Table V shows that lower feed gas inlet pressure in the light ends recovery facilities of a steam cracker reduces operating costs.

What is claimed is:

1. A process for separating a feed gaseous mixture containing light hydrocarbons comprising $C_1$ to $C_{5+}$ hydrocarbons with or without hydrogen, into fractions, which comprises compressing the feed gas to a compressor discharge pressure in the range of 40 to 125 psia prior to passing it to a recovery operation, passing the compressed feed gas in series through a sequence of refrigeration zones maintained at temperatures that progressively decrease from first to last in the sequence to condense in each zone a liquid portion of increasing volatility from first to last in the sequence, passing or pumping as required the liquid portion of each zone to a connected, respective fractionation tower maintained at suitable temperature and pressure to effect fractionation thereof and carrying out said fractionation, thereby achieving separation of the feed gas into fractions, to obtain a saving in energy as compared with carrying out said process employing a compressor discharge pressure above said range.

2. The process according to claim 1 in which the feed gas is compressed to a pressure in the range of 50 to 100 psia.

3. The process according to claim 2 in which the feed gas contains light olefinic constituents and comprises $C_5$'s down to methane and hydrogen.

4. The process according to claim 3 which comprises in combination the steps of:
   (a) compressing the feed gas to a pressure in the range of 50 to 100 psia;
   (b) maintaining a series of refrigeration zones at temperatures that progressively decrease from first to last in the series;
   (c) maintaining a series of fractionation towers, respectively connected to a respective one of the series of refrigeration zones;
   (d) passing the compressed feed gas to the first refrigeration zone;
   (e) condensing a portion of the feed gas in the first refrigeration zone, passing the liquid to a respective fractionation tower maintained at suitable temperature and pressure to effect fractionation thereof and repeating a sequence of passing the residual gas from a refrigeration zone to the next succeeding refrigeration zone, condensing and fractionation as many times as desired; and
   (f) recovering a tail gas from the last refrigeration zone.

5. The process according to claim 4 in which the last of said series of fractionation towers is a demethanizer.

6. The process according to claim 5 in which said series of fractionation towers comprises in this order: debutanizer, depropanizer, deethanizer and demethanizer.

7. The process according to claim 6 in which each fractionation tower in said series except the first receives distillate from the next preceding fractionation tower.

8. The process according to claim 7 in which a first refrigeration zone receives a $C_4$ fraction from the depropanizer, a second refrigeration zone receives a $C_3$ fraction from the deethanizer, a third refrigeration zone receives a $C_2$ fraction from the bottom of the demethanizer and a fourth refrigeration zone receives a $C_1$ fraction from the overhead of the demethanizer; each of said fractions being passed in countercurrent contact with feed or portions of feed to be separated.

9. The process according to claim 2 in which the feed gaseous mixture is the light ends from a thermal cracking process.

10. A process for separating a feed gaseous mixture containing light olefinic constituents and comprising $C_{5+}$'s down to methane and hydrogen, into fractions, which comprises in combination the steps of:
    (a) compressing the feed gas to a compressor discharge pressure in the range of 50 to 100 psia prior to passing it to a recovery operation;
    (b) cooling the compressed feed gas in a first refrigeration zone wherein it is passed in countercurrent contact with a $C_4$ stream taken from a depropanizer, to condense a $C_4$-$C_{5+}$ concentrate and passing the same to a debutanizer in which it is fractionated with removal of a liquid $C_{5+}$ fraction;
    (c) cooling the residual gas from said first zone in a second refrigeration zone wherein it is passed in countercurrent contact with a $C_3$ stream taken from a deethanizer, to condense a $C_3$-$C_4$ concentrate, pumping the same to a higher pressure and passing the same to the depropanizer in which it is fractionated in the presence of distillate from the debutanizer;
    (d) cooling the residual gas from said second zone in a third refrigeration zone wherein it is passed in countercurrent contact with a $C_2$ stream taken from a demethanizer, to condense a $C_2$-$C_3$ concentrate, pumping the same to a higher pressure and passing the same to the deethanizer in which it is fractionated in the presence of distillate from the depropanizer;
    (e) cooling the residual gas from said third zone in a fourth refrigeration zone wherein it is passed in countercurrent contact with a predominantly methane stream taken from the demethanizer, to condense a $C_1$-$C_2$ concentrate and separating tail gas from said fourth zone; and
    (f) pumping the condensed portion from said fourth zone to a higher pressure, passing it into the demethanizer and fractionating the same in the presence of distillate from the deethanizer to obtain a purified $C_2$ bottoms fraction and a predominantly methane vapor fraction; to obtain a saving in energy as compared with carrying out said process employing a compressor discharge pressure above said range.

11. The process according to claim 13 in which the refrigeration zones comprise pumparound towers.

12. The process according to claim 8 or 10 in which a portion of the debutanizer overhead vapor, after compression to suitable pressure, is partially passed to the second refrigeration zone, the remainder of said portion being passed to the depropanizer.

13. A process for separating a feed gaseous mixture containing light hydrocarbons comprising $C_1$ to $C_{5+}$ hydrocarbons with or without hydrogen, into fractions, which comprises compressing the feed gas to a compressor discharge pressure in the range of 40 to 125 psia, prior to passing it to a recovery operation, passing the compressed feed gas in series through a sequence of refrigeration zones maintained at temperatures that progressively decrease from first to last in the sequence to condense in each zone a liquid portion of increasing volatility from first to last in the sequence, passing or pumping as required the liquid portion of each zone to a connected, respective fractionation tower maintained at suitable temperature and pressure to effect fractionation thereof and carrying out said fractionation, thereby achieving separation of the feed gas into fractions; said feed gaseous mixture being the light ends from a steam cracking process wherein at least a portion of the cracking feed is liquid hydrocarbon; to obtain a saving in energy as compared with carrying out said process employing a compressor discharge pressure above said range.

14. The process according to claim 13 in which tail gas is recovered from the last refrigeration zone in the sequence.

* * * * *